Nov. 28, 1944. B. MILLER Re. 22,572

ELECTRIC FLASH PRODUCING METHOD AND APPARATUS

Original Filed Feb. 5, 1934 3 Sheets-Sheet 1

INVENTOR
BENJAMIN MILLER
BY Edmund G. Porden
ATTORNEY

Nov. 28, 1944. B. MILLER Re. 22,572

ELECTRIC FLASH PRODUCING METHOD AND APPARATUS

Original Filed Feb. 5, 1934 3 Sheets-Sheet 2

INVENTOR
BENJAMIN MILLER
BY Edmund J. Borden
ATTORNEY

ELECTRIC FLASH PRODUCING METHOD AND APPARATUS

Original Filed Feb. 5, 1934 3 Sheets-Sheet 3

INVENTOR
BENJAMIN MILLER
BY Edmund G. Borden
ATTORNEY

Reissued Nov. 28, 1944

Re. 22,572

UNITED STATES PATENT OFFICE 22,572

ELECTRIC FLASH PRODUCING METHOD AND APPARATUS

Benjamin Miller, Richmond Hill, N. Y., assignor, by mesne assignments, to Cities Service Oil Company, New York, N. Y., a corporation of Pennsylvania Original No. 2,073,247, dated March 9, 1937, Serial No. 709,901, February 5, 1934. Application for reissue April 5, 1938, Serial No. 200,090

18 Claims. (Cl. 177—311)

This invention relates generally to electric flash producing methods and apparatus. It is particularly directed to improved method and means for checking the ignition timing of a variable speed spark ignition engine.

Variable speed spark ignition engines, particularly automotive engines, are usually provided with automatic means for changing the point in the cycle at which the spark occurs, as the speed of the engine is changed. It is desirable to be able to determine whether these means are functioning properly without removing the timing mechanism from the engine. The primary object of the invention is to provide method and means whereby the point in the cycle of a spark ignition engine at which the ignition impulse is transmitted to the cylinder and the speed of the engine may be concurrently determined.

It has been proposed to check the action of the automatic spark advance by examining stroboscopically a moving part of the engine by the light of a neon lamp which is energized by the ignition impulses. While this stroboscopic method is sound in principle, the neon lamp when energized by the ignition impulses is a poor stroboscope, because the intensity of illumination is low and the definition not sharp. In addition, unless the speed of the engine is determined concurrently with the ignition timing, the check is only qualitative. For a satisfactory quantitative check, it is necessary to have a stroboscope which furnishes high intensity of illumination with sharp definition, and to have also a way to determine concurrently the speed of the engine.

The intensity of illumination furnished by a neon lamp excited by the ignition impulses is necessarily low, for the reason that only a small amount of energy is available from the ignition circuit. The lack of definition is due to the shape of the ignition wave. A typical ignition wave is shown in the oscillogram which is Fig. 1 of the drawings forming a part hereof. It may be seen that this ignition impulse is a damped oscillation whose fundamental frequency is of the order of 3000 cycles and which is practically completed in about .001 second. The peak voltage, frequency, and duration of the ignition impulse are different in various ignition systems, depending on the construction of the ignition system, the primary voltage applied, the speed of the engine, and other factors which, in general, cannot be controlled at the time of test. The peak voltages will vary from about 3000 to 20,000 or over, the fundamental frequency from about 2000 to about 5000 cycles, and the duration from about .0005 second to .002 second. For a neon lamp to be useable as a stroboscope on all ignition systems and under all practical conditions, it must be so constructed that it will become conducting and furnish light with a potential not higher than about 3000 volts. After conduction has started, a neon lamp will continue to conduct until the potential has been reduced to a much lower value, the cut-off voltage (which may be only a few hundred volts), and thereafter the lamp remains in a conductive state for a limited time of roughly .0001 to .001 second. The second and even later peaks of the oscillating ignition impulses of an engine spark ignition system may exceed the lower critical potential of the lamp and occur with a frequency greater than 1000 per second. Therefore, in a neon lamp energized by ignition impulses there will be several flashes on each ignition impulse, each of which will produce an image. If the images overlap, there will appear to be a single broad image, but very often several distinct images may be seen.

Another important object of the present invention is therefore to provide method and apparatus generally adapted for stroboscopic examination of spark ignition engines by means of an illumination flash of high intensity, and which gives sharp images free of any multiple image defect.

Since low flash intensity and lack of definition are inherent in the broad combination of ignition impulse generator and neon lamp stroboscope, it is necessary to use some other method to obtain high intensity and sharp definition. The method used in this invention is to cause a condenser, charged from a source independent of the ignition system to discharge through a neon lamp, or other gaseous conductor lamp, at the time that the ignition impulse is transmitted to the cylinder. By using an independent energy source, the intensity of illumination may be made as high as is desired. By properly arranging the condenser circuits, it is possible to get one, and only one, flash for each ignition impulse and to make the flash of such short duration that an extremely sharp image is obtained. The arrangement of the condenser circuits to achieve these ends is an important part of this invention.

It has long been known that a gaseous conductor lamp, such as a neon lamp or a mercury vapor lamp, may be arranged in a circuit whose potential is less than the breakdown potential of the lamp, and that no current will flow until the lamp is put into the conducting state by a momentary impulse, which may be a high voltage discharge through the lamp, the incidence of light on one of the electrodes, the generation of a high frequency field in the lamp, or some other means of initially ionizing the gas and/or producing a supply of electrons at the cathode. I have found that connecting a conductor placed near the cathode of such a gaseous discharge lamp to the spark plug or other part of the high tension side of the ignition system is sufficient to cause the lamp to conduct when a potential considerably less than the break-down potential is supplied to its electrodes. After conduction has started, it will continue until the potential between the electrodes has been reduced below the cut-off voltage, which may be only a few volts with a mercury vapor lamp, or up to 200 or 300 volts with neon or other permanent gas lamps, depending on their construction, temperature, pressure, etc. After conduction has ceased because the potential has dropped below the cut-off voltage, the conducting state dies away in a short but finite time, and the initial non-conducting state is resumed after a period which is of the order of .0001 to .001 second. The term "trigger tube" will be hereinafter employed to designate a gaseous conductor device of the type above referred to in which conduction of current through a gaseous medium between two primary electrodes is initiated by applying the proper stimulus, as for example by changing the potential of a third electrode. As examples of trigger tubes may be mentioned the mercury arc lamp with a starting band, the grid-glow tube, and the thyratron.

Stroboscopes have been constructed using the principle of a condenser discharge through a gaseous conductor lamp, the discharges being caused to occur at the desired times by applying the appropriate stimulus. The lamp goes out when the condenser has discharged, and will not light again until the condenser has been recharged and the stimulus reapplied, so long as the potential of the condenser during the recharging period does not rise more rapidly than the potential required for current flow through the lamp rises during the deionization period. It is merely necessary to insert in the charging circuit of the condenser a resistance, which may have inductance or which may be noninductive, of such value that the lamp does not carry a steady arc. Such stroboscopes cannot be used with the ignition impulses of a spark ignition engine as stimuli, since they give several images for each ignition impulse, because the ignition impulse is a train of stimuli which is of relatively long duration. In order to insure that there will be only one flash for each ignition impulse, it is another purpose of the present invention to use a tuned condenser charging circuit.

Another important object of the present invention is therefore to provide method and means adapted for producing flashes of high intensity and for giving sharp stroboscopic images when the flashes are initiated by impulses such as the spark ignition impulses of the ordinary spark ignition engine.

To accomplish this object the invention contemplates employment of a trigger tube flashing device having two primary electrodes in circuit with a condenser which receives its charge from an oscillating circuit, and having a connection with the ignition circuit of a spark-ignition engine or other means for supplying the initiating impulse. By including resistance and inductance of predetermined magnitude relative to the condenser capacity in the condenser charging circuit, the charge of the condenser may be built up so gradually during the first part of the charging cycle following a discharge as to hold the condenser charge below the lower critical potential of the trigger tube for at least .001 second after the flash has occurred, while permitting an increased rate of charging during the latter part of the charging cycle to bring the condenser charge to flash producing intensity prior to the instant when the next flash is due to occur. An important feature of the invention therefore resides in the employment either of a slightly damped oscillating circuit including an electric check valve, or of a highly damped oscillating circuit, for charging a condenser, the discharge of which produces the flash of a trigger tube flashing device.

With the above and other objects and features in view, the invention resides in the method and apparatus for producing electrical energy flashes and determining impulse rates, which is hereinafter described and particularly defined in the appended claims.

The invention will be hereinafter more particularly described by reference to the accompanying drawings, in which Fig. 1 is an oscillogram of a typical ignition impulse of a spark ignition engine.

Fig. 2 sets forth the rise of condenser potential in typical non-oscillating and oscillating circuits.

Fig. 3 sets forth curves to scale showing respectively the charging current and rise of condenser potential in a slightly damped oscillating circuit during the first half wave.

Fig. 4 is a wiring diagram of a condenser discharge trigger tube stroboscope having an alternating current source of energy, a highly damped oscillating condenser charging circuit and an ammeter for measuring the charging current.

Fig. 5 is a wiring diagram of a condenser discharge trigger tube rate meter having a slightly damped oscillating condenser charging circuit including an electric check valve, together with a galvanometer for measuring by comparison of voltages across fixed and adjustable resistors connected respectively in series and parallel with the trigger tube, the number of flashes per unit of time initiated by a photo cell.

Fig. 6 is a wiring diagram of a condenser discharge trigger tube frequency meter having an oscillating condenser charging circuit including an electric check valve, together with means for measuring by comparison of voltages across fixed resistors connected respectively in series and parallel with the trigger tube, the frequency of an alternating electric current which flows through a transformer connected to the exciting electrode of the trigger tube.

Figure 10:
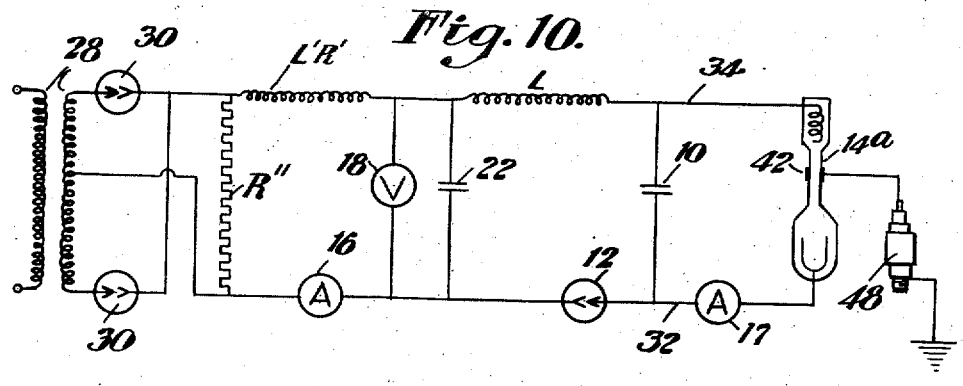

Fig. 10 is a wiring diagram of a condenser discharge trigger tube stroboscope and rate meter having a slightly damped oscillating condenser charging circuit including an electric check valve and including at least one ammeter for measuring the current flowing through the trigger tube and a voltmeter for measuring the average potential of a reservoir condenser which is charged from alternating current mains by means of a transformer and full wave rectifier.

Figure 2:
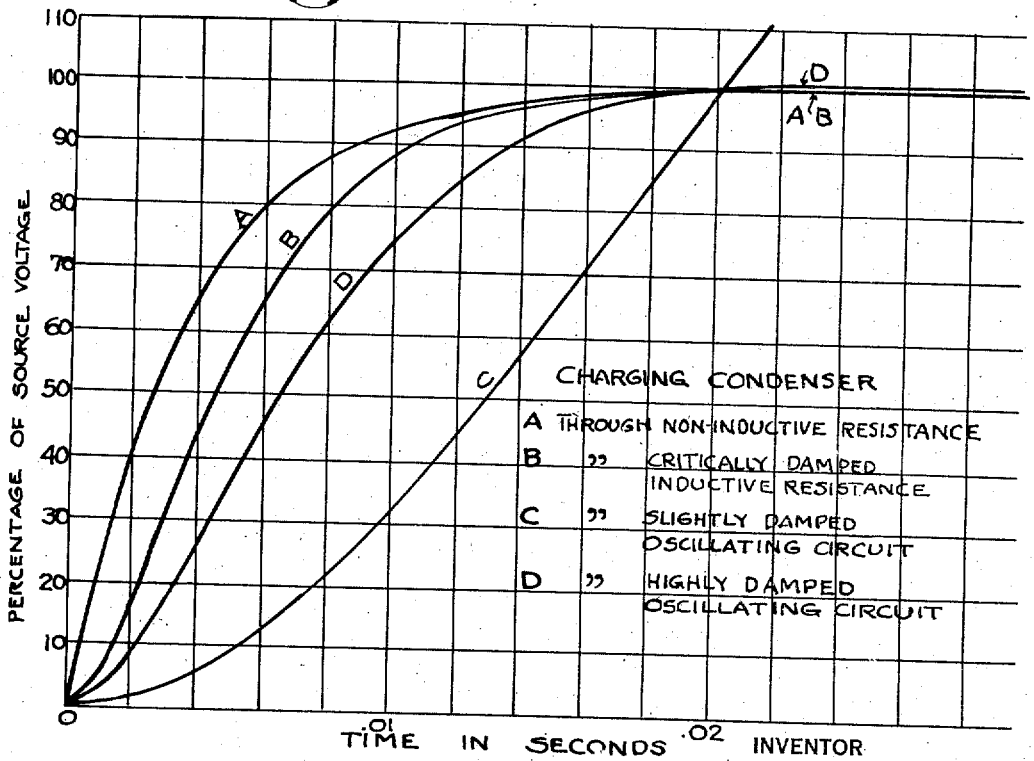

Fig. 2 shows the rise of voltage in several condenser charging circuits, all of which are designed so that the condenser is practically fully charged in .02 second. Such a charging time will be suitable for use with a 4-stroke cycle automotive engine whose maximum speed is about 4800 R. P. M. and which therefore delivers 40 ignition impulses to each cylinder each second. Curve A shows the rise of voltage in a circuit containing no inductance. It may be seen that at the end of .002 second the voltage has already exceeded 40% of the source voltage. If such a charging circuit were used, the condenser would be ready to maintain conductance in a gaseous conductor lamp in circuit therewith at the end of about .0004 second after discharge, and there would therefore be several images with practically every ignition system which might be used for stimulating discharge of the condenser through the lamp. Curve B shows the rise of voltage in the condenser when charged through a resistance having the maximum amount of inductance possible without oscillation. It may be seen that at the end of .002 second the condenser potential has reached 17% of the source potential. The condenser in such a circuit would be ready to flash after about .0015 second. Such a circuit could be used with most ignition systems, but with some ignition systems there would be two flashes. Curve C shows the rise of voltage in a circuit which is primarily inductive, or in other words, a slightly damped oscillating circuit. It may be seen that at the end of .002 second the voltage of the condenser is only about 2% of the source voltage, and the condenser is not ready to flash until more than .005 second has elapsed. Such a circuit would not give more than one image with any commercial ignition system. However at the end of .02 second, the voltage is still rising steeply and the condenser voltage will continue to oscillate above and below the source voltage for a considerable time. At speeds slower than 4800 R. P. M., therefore, the condenser voltage at the time of flash may vary considerably. Since the intensity of the flash is roughly proportional to the square of the voltage, this condition is undesirable. Curve D shows the rise of voltage in a highly damped oscillating circuit. It may be seen that at the end of .002 second the condenser voltage is only about 8½% of the source voltage, so that with this circuit, also, all commercial spark ignition systems could be used without getting more than one flash per ignition impulse. Although the voltage is still rising at the end of .02 second, it is rising very slowly, and the peak voltage is only about ½ of 1% higher than the source voltage, and thereafter the voltage is never more than ½ of 1% different from the source voltage. In order to be useable with spark ignition systems, the condenser charging circuit should be so arranged that it is a highly damped oscillating circuit, that is, the peak voltage should be higher than the source voltage, but no more than about 4% higher and preferably not more than ½ of 1% higher.

Figure 4:
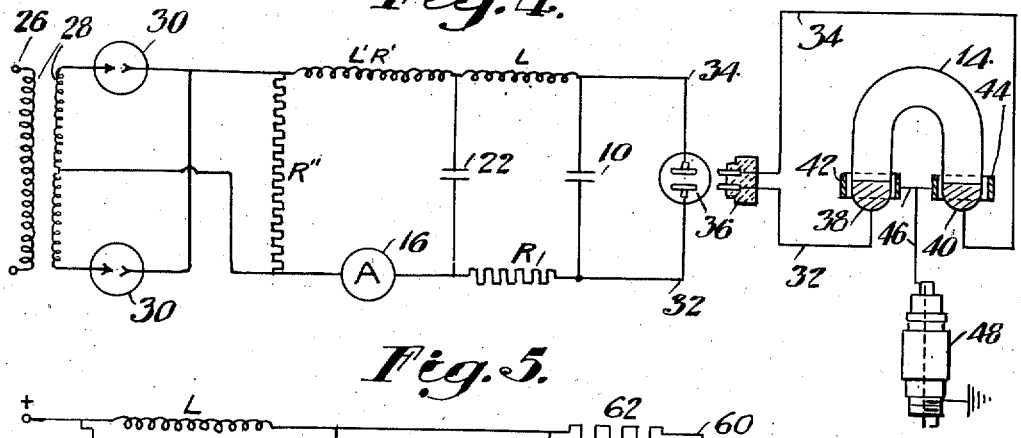
Figure 7:
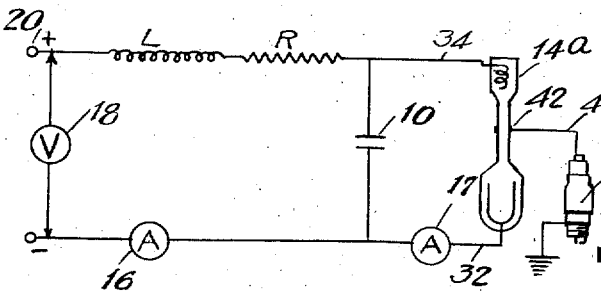
Fig. 7 is a wiring diagram of a condenser discharge trigger tube stroboscope having a highly damped oscillating condenser charging circuit and including an ammeter for measuring discharge current and a volt-meter for measuring the potential of the source of current employed in charging the condenser.

Fig. 4 and Fig. 7 show condenser charging circuits which are highly damped oscillating circuits. As an example, condenser 10 may be a 2-microfarad condenser charged from a source of potential of 1000 volts through an inductance of 8 to 10 henries and a resistance of 3200 to 4000 ohms. The inductance is represented at L and the resistance at R.

Figure 1:
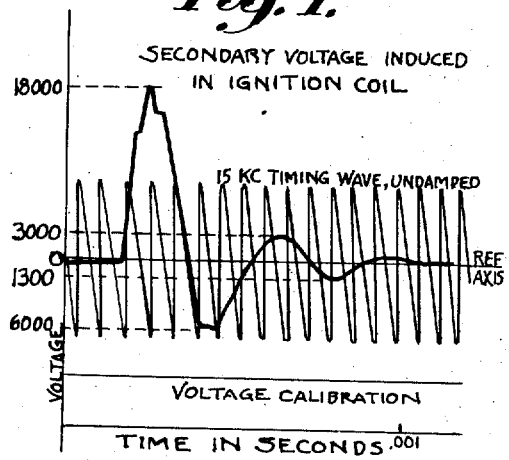
Figure 3:
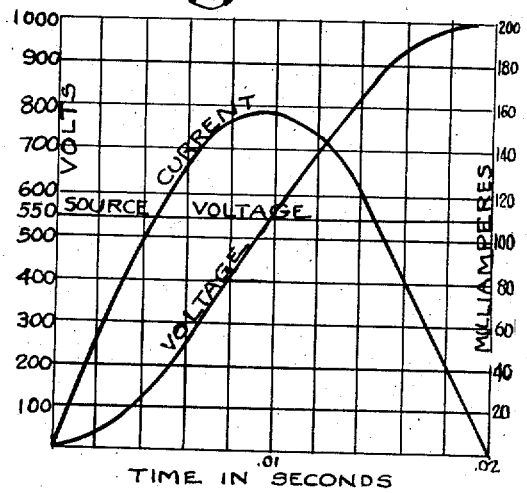
Figure 5:
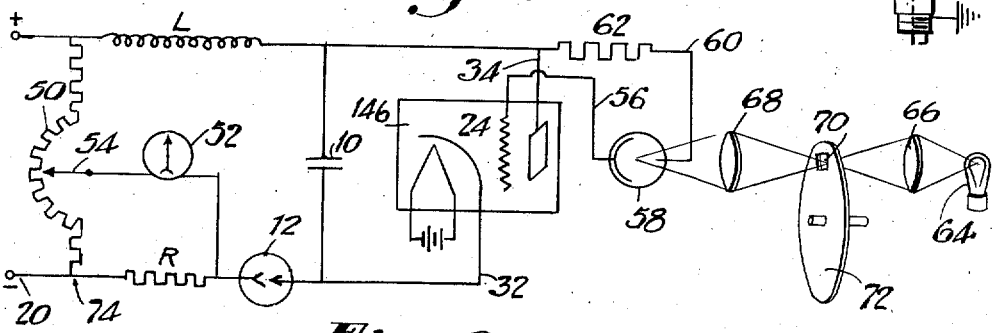
Figure 6:
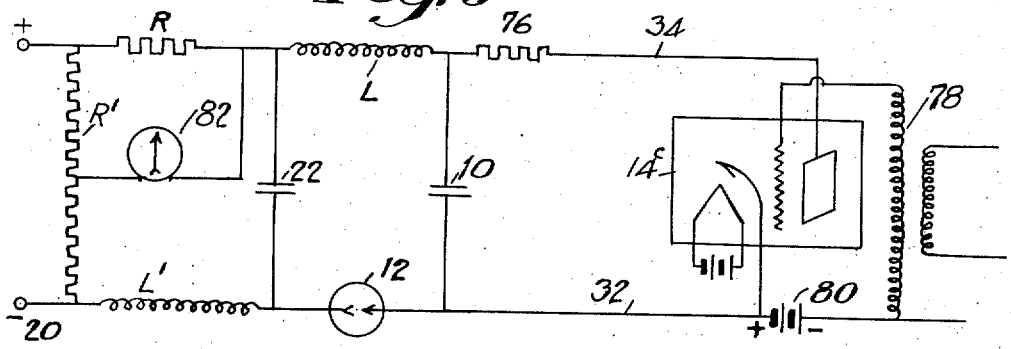

A preferred method of charging the condenser is to use a slightly damped oscillating circuit and an electric check valve. The rise of voltage and the rise and fall of current in such a circuit are shown in Fig. 3. With a source voltage of 550, the condenser voltage rises in .02 second to 1000 volts, the current rises from zero to about 155 milliamperes in something less than .01 second, and then falls again to zero at the end of .02 second. The tendency of the over-charged condenser to discharge back to the source of voltage is overcome by the electric check valve, which allows current to flow but one way. Current cannot flow through the check valve until the condenser voltage has been reduced below the source voltage. It may be seen that the condenser voltage at the end of .002 second is even lower in this case than in the case of the highly damped oscillating circuit of Fig. 2. Also the condenser potential at the time of flashing is independent of the rate of flashing so long as the flashes occur at intervals not shorter than .02 second. This circuit has the additional advantage that the voltage of the source need be only slightly more than half the voltage to be used on the condenser; that the efficiency, which in the usual condenser charging circuit is 50%, may be made 95% or higher; and that there is no current flow at the time of flash. Fig. 5 and Fig. 6 show slightly damped oscillating condenser charging circuits with electric check valves. As an example, 10 may be a 2-microfarad condenser charged from a 550 volt source through an inductance of 20 henries which has a resistance of 400 ohms. This inductance is shown at L. The electric check valve is shown at 12. A hot cathode mercury vapor tube may be used conveniently, as an electric check valve. I have found that the type 83 rectifier used in radio receiving sets suitable with both anodes connected to condenser 10.

By using the highly damped oscillating circuit shown in Figures 4 and 7, or the slightly damped oscillating circuit with check valve shown in Figures 5 and 6, it becomes possible to determine the engine speed by measuring the current flowing through the lamp 14. Since with a constant potential source the condenser 10 is charged to the same potential before every flash, the quantity of electricity discharged per flash is constant, and the total quantity of electricity delivered to the lamp 14 per second is directly proportional to the number of flashes per second. Since an ordinary ammeter reads directly the average quantity of electricity per second, it may be calibrated directly in ignition impulses per second or in revolutions per second or per minute.

In Fig. 7, 16 and 17 are ammeters. Since the ordinary ammeter has a relatively high inductance and resistance, and since the inductance and resistance of the condenser discharge circuit should be low, for reasons to be explained below, it is preferable to use a thermal ammeter 17 if the instrument is to be placed in the condenser discharge circuit. A thermal ammeter reads effective current. The effective current in the condenser discharge circuit is a function of the condenser voltage, the resistance of the discharge circuit, and the number of flashes per second, so that for any particular set of conditions an effective current meter in the condenser discharge circuit may also be calibrated directly in ignition impulses per second or revolutions per second or per minute. The resistance of the condenser discharge circuit may be different with different lamps, so that if a thermal meter is used, it is necessary to calibrate the meter with the lamp with which it is to be used. In order to avoid the necessity of calibrating the meter with the lamp, it is preferable to use an average current meter and to place it in the condenser charge circuit, such as 16. The reading is then independent of the resistance of the condenser discharge circuit, and one lamp may be replaced by another without changing the calibration of the meter.

As pointed out above, the average current is directly proportional to the flashing rate if the condenser potential at the time of flash is constant. At a particular flashing rate, the average current is proportional to the potential of the source. It is, therefore, necessary to use a source of constant potential, or to measure the potential, if it cannot be maintained constant, in order to interpret the meter reading in terms of flashing rate. In Fig. 7, 18 indicates a voltmeter, which is used to measure the potential of the source 20. The voltmeter may be used either to determine that the potential is correct, or to determine the actual potential, in order to correct the ammeter reading. It should be noted that 16 may also be a thermal meter.

It is usually difficult to maintain the potential of the source constant with varying loads. Change of potential with load, that is, the regulation of the source, causes the ammeter reading to vary from direct proportionality with the flashing rate. If the regulation remains constant, it is possible to calibrate the instrument at known flashing rates with a source whose potential is known at some one flashing rate, preferably zero, and thereafter to adjust the potential to the same value at the same flashing rate. For example, source 20 of Fig. 7 may have a potential of 1000 volts when no current is being drawn from it. When an average current of 100 milliamperes is being drawn, the average potential of the source may be reduced to 900 volts. In order to insure calibration constancy, it is merely necessary to be sure that the no-load potential is 1000 volts and that the regulation is constant. If the potential is determined at no load and at the highest load to be used, that is, at the highest flashing rate to be measured, and if these values are the same as at the time of calibration, it can be assumed that intermediate values will also be correct.

The current flowing into the condenser 10 consists of a series of impulses which, in general, have the shape shown in Figure 3, which are separated by intervals of no current flow. Each flash of lamp 14 causes a current impulse of the same kind, and the less frequent the flashes the longer are the intervals between current impulses. When the intervals become very long, that is, at low flashing rates, the ammeter needle tends to vibrate. To reduce this tendency, it is desirable to charge the condenser 10 from a source which is a larger condenser, such as 22 in Fig. 4. The ammeter 16 may then be placed in the charging circuit of this reservoir condenser and the reservoir condenser charging circuit preferably contains a large amount of inductance, represented as L'R'. The effect of using a reservoir condenser kept charged through a high inductance is to smooth the current passing through the ammeter 16. The average current is, of course, the same in all three circuits, that is, the lamp flashing circuit, the flashing condenser charging circuit, and the reservoir condenser charging circuit; but the intervals between current impulses are relatively long in the lamp flashing circuit and relatively short in the reservoir condenser charging circuit as compared in both instances to the intervals between current impulses in the flashing condenser charging circuit.

The mercury vapor lamp, shown at 14 in Fig. 4, and the neon lamp, shown at 14*a* in Fig. 7, are members of the class of trigger tubes, that is, gaseous discharge devices which may be arranged so that they start to conduct only when the proper stimulus is applied. 14*b* in Fig. 5 and 14*c* in Fig. 6, are trigger tubes in which the stimulus is the changing of the potential of a third electrode, usually in the form of a grid 24 between the cathode and anode. 14*b* is so constructed that it becomes a conductor when the grid 24 is made positive to the cathode; that is, potential may be applied between the anode and cathode but no current will flow until a potential is applied to the third electrode which makes it positive with respect to the cathode. 14*c* is constructed so that no current will flow so long as the third electrode is maintained sufficiently negative with respect to the cathode, but current will start to flow if there is a potential between the anode and cathode when the negative potential of the third electrode, with respect to the cathode, is reduced below a critical value. 14*b* may be called a positive grid trigger tube, and 14*c* a negative grid trigger tube. These devices are characterized by the fact that the grid potential at which current flow starts is a function of the potential between the anode and cathode, as well as of the construction of the tube. Certain of them may be positive grid trigger tubes with a relatively low potential between anode and cathode, and negative grid trigger tubes with a high potential between the anode and cathode. Others are so constructed that with the highest safe potential between anode and cathode, current will not flow until the grid is made positive with respect to the cathode. A third type is so constructed that a negative bias is required to keep current from flowing when the anode and cathode are connected to a source where potential is but slightly higher than the cut off voltage. All of the trigger tubes have the common characteristic that after current flow has been initiated, it will continue until the anode to cathode potential has been reduced below the cut-off voltage of the tube, which is in general considerably lower than the voltage initially applied between anode and cathode.

The several circuits shown in Figures 4, 5, 6 and 7 will now be more particularly described. Fig. 4 shows a condenser discharge trigger tube stroboscope and rate meter particularly adapted for use in checking the ignition timing of a spark ignition engine. 26 is a source of alternating current energy, to which is connected the primary of transformer 28. The output of the transformer is connected through the rectifiers 30 to the bleeder resistor R''. Part of the rectified current flows through R''; the remainder flows through inductive resistance L'R' and ammeter 16 to the reservoir condenser 22. From the reservoir condenser 22, current flows through the inductance L and resistance R to the flashing condenser 10. Leads 32 and 34 connect flashing condenser 10 to the mercury vapor lamp 14 through the separable connector 36. Mercury vapor lamp 14 consists of a glass inverted U-tube having two internal mercury pool electrodes, 38 and 40 respectively. As shown, electrode 38 is cathode, and electrode 40 is anode, but by changing the relative positions of the parts of separable connector 36, 38 may be made cathode and 40 anode. Metal bands 42 and 44, on the outside of the glass tube near the mercury levels, are connected by lead 46 to the center electrode of spark plug 48.

When an ignition impulse is delivered by the ignition system of the engine to spark plug 48, metal bands 42 and 44 take up the high potential impressed on the center electrode of spark plug 48, causing the mercury vapor lamp to become conductive. Flashing condenser 10 then discharges through mercury vapor lamp 14, resulting in a flash of light of extremely brief duration. The time during which current flows through the mercury vapor lamp 14 is determined by the capacity, inductance, and resistance of the condenser discharge circuit. The lower the capacity, inductance, and resistance of the condenser discharge circuit, the shorter the time of discharge and the less the duration of the light flash. The capacity is principally that of the flashing condenser. The inductance and resistance are those of the leads and the lamp. By using relatively short heavy leads kept parallel and close together and a lamp having a short relatively wide discharge path, the inductance and resistance can be made quite low. The discharge time is then nearly proportional to the square of the capacity of the flashing condenser. Using 10 feet of #14 parallel wire for leads and a lamp having a discharge path approximately 4'' long and ¼'' in diameter, the discharge time will be about 1 microsecond with a 2-microfarad flashing condenser, so that an intense, well-defined image is produced. Flashing condenser 10 is then recharged from reservoir condenser 22 through the highly damped oscillating circuit, as explained above, and discharges again the next time an ignition impulse is delivered to spark plug 48. The average current flowing through mercury vapor lamp 14 is indicated by ammeter 16, which is preferably an average current, D'Arsonval type milliammeter. The reading corresponding to any flashing rate, and therefore to any engine speed, may be calculated from the voltage of source 26 and the circuit constants, but it is preferable to calibrate ammeter 16 in impulses per second or revolutions per minute by direct determination at several known flashing rates. The calibration of the instrument will remain constant so long as the potential of source 26 is the same as it was when the calibration was made. If it is necessary to use the instrument in various places, it is preferable to arrange taps on the primary of transformer 28 so that the same secondary voltage may be obtained.

Fig. 7 differs from Fig. 4 chiefly in that a neon lamp 14*a* is used, together with a source 20 of direct current charging potential. The neon lamp has the advantage that it may be placed in any position, whereas the mercury lamp must be held so that the mercury pools are in contact with their respective lead-in wires.

Fig. 5 shows an arrangement particularly adapted for stroboscopic examination of a moving element and for determining its speed. The source of potential 20 is directly connected to potentiometer 50 and also to the flashing condenser 10 through inductance L and resistance R and check valve 12. Galvanometer 52 is connected, as shown, to the positive end of resistor R and to adjustable contact 54, which may be set at various points along potentiometer 50. Flashing condenser 10 is connected to trigger tube 14*b* through leads 32 and 34, lead 32 connected to the cathode, and lead 34 to the anode. The grid 24 of trigger tube 14*b* is connected through lead 56 to the cathode of photo-electric cell 58. The anode of photo-electric cell 58 is connected through lead 60 and resistor 62 to the anode of trigger tube 14*b*. The potential of flashing condenser 10 and the construction of trigger tube 14*b* are such that no current flows through the trigger tube 14*b* until its grid has become positive with respect to its cathode. Light from lamp 64 may be directed onto cathode of photo-electric cell 58 by lenses 66 and 68, when an aperture 70 of a revolving disc 72 comes into the light path. This causes photo-electric cell 58 to become a conductor, and brings the potential of the grid of trigger tube 14*b* to a value positive with respect to the cathode of the trigger tube, thus initiating conduction. Flashing condenser 10 discharges through the trigger tube 14*b* once for each revolution of disc 72, which is mounted so as to revolve at a rate proportional to the speed of the moving element which is to be examined. The average voltage drop across R is proportional to the average current flowing through the trigger tube 14*b* and therefore to the product of the potential of source 20 and the flashing rate. The voltage drop across the portion of 50 between end 74 and movable contact 54, is dependent on the position of movable contact 54 and the potential of source 20. It is possible to move contact 54 to a position such that galvanometer 52 shows that the potential at 54 is the same as the potential at the positive end of R at any particular flashing rate. This position will be independent of the potential of 20, since a change in the potential of 20 will change the potential drops across R and the selected portion of 50 equally. Each position of 54, therefore, corresponds to a particular flashing rate, and this correspondence is independent of the potential of source 20. The function of resistor 62 is to limit the current flow in the excitation circuit to a safe value.

Fig. 6 shows apparatus particularly adapted for checking the frequency of an alternating current. Current flows from source of potential 20 through resistor R' and through resistor R and inductance L' to reservoir condenser 22, and from reservoir condenser 22 through inductance L and check valve 12 to flashing condenser 10. Flashing condenser 10 is connected to trigger tube 14*c* through leads 32 and 34 and a resistor 76. The function of resistor 76 is to limit the maximum current flow through trigger tube 14*c*, and it may be omitted if desired. The current whose frequency is to be checked is impressed on the primary of transformer 78 whose secondary is in the cathode-grid circuit of trigger tube 14c, in series with biasing potential 80. When no current flows in the primary of transformer 78, the grid 24 of trigger tube 14c is maintained sufficiently negative by biasing potential 80 so that trigger tube 14c does not conduct. On each cycle of alternating current in the primary of transformer 78 the grid of trigger tube 14c is made alternately more and less negative with respect to the cathode. At the instant that the grid becomes sufficiently less negative, trigger tube 14c starts to conduct, and condenser 10 discharges through trigger tube 14c and resistor 76. Flashing condenser 10 then recharges from reservoir condenser 22 through inductance L and check valve 12. The average current through resistor R, and therefore the average voltage drop across resistor R, are proportional to the product of the potential of source 20 and the flashing rate, which at any time is proportional to the frequency of the current flowing in the primary of transformer 78. Galvanometer 82 is connected between the negative end of resistor R and a selected portion of resistor R', such that it shows no difference of potential at a selected flashing rate. Since the current flow through resistor R' is also proportional to the potential of source 20, the potential of source 20 may be changed without causing current flow through galvanometer 82 so long as the frequency of the alternating current flowing in the primary of transformer 78 remains constant. If the frequency should decrease, the voltage drop across R will increase and the galvanometer will deflect to the right, say. If the frequency should increase, the voltage drop across resistor R will increase and the galvanometer 82 will deflect to the left, say. The galvanometer may therefore be calibrated in terms of frequency. The frequency for center position of the galvanometer is independent of the potential of source 20, and the direction of deflection of the galvanometer when the frequency changes from the calibration frequency is also independent of the potential of 20. The extent of the deflection for a given change of frequency is, however, determined by the potential of 20, and if the deviation of the frequency of the calibration frequency is to be known accurately, it is necessary to maintain the potential of 20 constant, or to determine its potential and make correction thereby.

One arrangement of the apparatus which has been found suitable for effecting stroboscopic examination of a spark ignition engine and for measuring the engine speed in accordance with the present invention, combines features of the apparatus illustrated in Figs. 4, 6 and 7 (see Fig. 10) as follows:

Referring to Fig. 10, the source of energy is a 115/1100 volt center tapped transformer 28 which supplies high tension current through mercury vapor rectifiers 30 (type 83 tube) and through a 120 henry, 700 ohm choke coil L'R' to a reservoir condenser 22 of 54 microfarads capacity. A highly damped milliammeter 16 is shunted in the lead to condenser 22 to measure the average current flow to the condenser in terms of R. P. M. of the engine under examination. Across the leads connecting the condenser 22 with the transformer 28 there is shunted a 50,000 ohm resistance R'' and a voltmeter 18. From the reservoir condenser 22 the current flows through a 60 henry inductance L having a resistance of 350 ohms and through a mercury vapor rectifier 12 to the lighting condenser 10. The mercury vapor rectifier serves as an electric check valve. The condenser 10 has a capacity of 4½ microfarads. Leads 32 and 34 connect the lighting condenser 10 to the appropriate electrodes of the gaseous conductor lamp 14a. Excitation of the lamp 14a is effected by a spark ignition circuit of the engine under examination by connecting one of its spark plugs 48 with an auxiliary electrode 42 of the lamp. A thermal ammeter 17 may be connected in one of the leads of the condenser discharge circuit and used to perform the function recited above for ammeter 16. The charging time of this circuit is less than .06 second, which makes it suitable for any flashing rate up to 1000 per minute, which corresponds to an engine speed of 2000 R. P. M. for a 4-cycle engine. For speeds up to 2000 flashes per minute inductance L may be reduced to 30 henries and the capacity of condenser 10 reduced to 2¼ microfarads. For speeds up to 4000 flashes per minute the inductance L may be reduced to 15 henries and the capacity of condenser 10 to 1⅛ microfarads.

Figure 8:
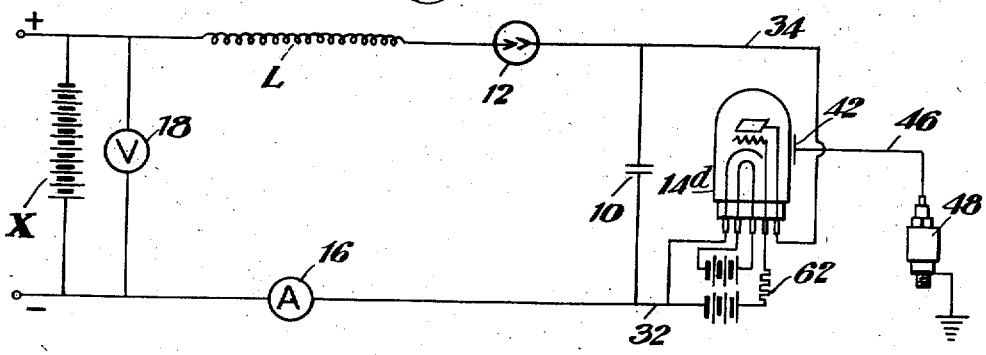
Fig. 8 is a wiring diagram of a condenser discharge trigger tube rate meter having a slightly damped oscillating condenser charging circuit including an electric check valve and including an ammeter for measuring discharge current and a voltmeter for measuring the potential of a source of constant potential current employed in charging the condenser.

Fig. 8 differs from Fig. 7 chiefly in employing a trigger tube 14d of the type illustrated as 14b and 14c in Figs. 5 and 6, and in embodying a check valve 12 in place of the resistor R in the condenser charging circuit. A source of constant potential in the form of a battery X is illustrated in Fig. 8 for charging condenser 10. Voltmeter 18 is provided for checking the potential of battery X which may change slowly with time.

Figure 9:
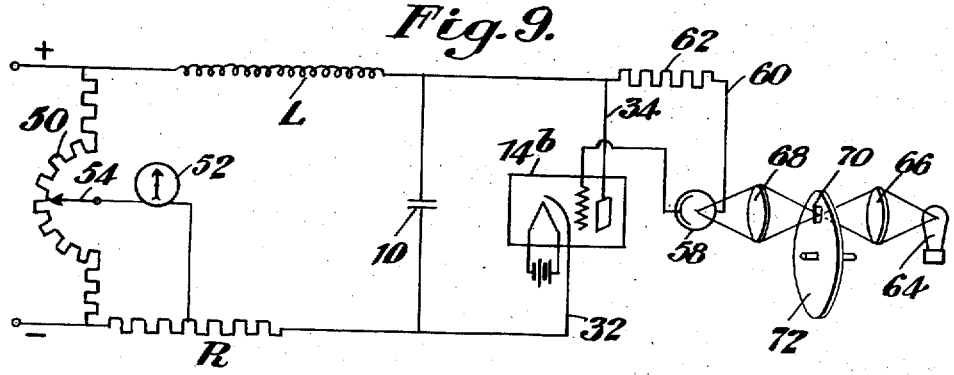
Fig. 9 is a wiring diagram of a condenser discharge trigger tube rate meter having a highly damped oscillating condenser charging circuit, together with a galvanometer for measuring by comparison of voltages across fixed and adjustable resistors connected respectively in series and parallel with the trigger tube, the number of flashes per unit of time initiated by a photocell.

Fig. 9 differs from Fig. 5 chiefly in that the check valve 12 of Fig. 5 is replaced by a continuation of the resistor 5.

The invention having been thus described, what is claimed as new is:

1. In apparatus for producing substantially uniform electrical energy flashes, a condenser, a source of energy for charging the condenser, means connected in series circuit with the energy source and with the condenser, said means comprising inductance and resistance of such magnitude relative to the capacity of the condenser that the charging circuit is an oscillating circuit which is so highly damped that the maximum potential to which the condenser is charged is not more than 4% higher than the potential of the energy source, and means for discharging the condenser at selected intervals.

2. In electric flash producing apparatus for measuring impulse rates, a condenser, a source of energy for charging the condenser, means connected in series circuit with the energy source and with the condenser, said means comprising inductance and resistance of such magnitude relative to the capacity of the condenser that the charging circuit is an oscillating circuit which is so highly damped that the maximum potential to which the condenser is charged is not more than 4% higher than the potential of the energy source, whereby the potential of the condenser at the time of discharge is made substantially uniform and independent of the impulse rate, means for discharging the condenser periodically, the number of discharges per unit of time being proportional to the rate to be measured, and an ammeter connected in series circuit with the condenser.

3. Electric flash producing apparatus for measuring impulse rates comprising a condenser, a source of energy for charging the condenser, means connected in series circuit with the energy source and with the condenser for charging the condenser to a predetermined potential higher than the potential of the energy source, said means comprising an electric check valve and an inductance forming with the condenser an oscillating circuit, means for discharging the condenser periodically, the number of discharges per unit of time being proportional to the rate to be measured, and an ammeter connected in series circuit with said condenser.

4. In flash producing apparatus, a trigger tube flashing device, a condenser shunted across two electrodes of said device, means for charging the condenser comprising a source of current and an electric check valve and an inductance forming with the condenser an oscillating circuit, an ammeter connected in series circuit with the condenser, and means for applying a discharge initiating stimulus to said trigger tube to cause said condenser to discharge through said device.

5. Electric flash producing apparatus for measuring impulse rates comprising a trigger tube flashing device, means for applying discharge initiating stimuli to said device at a rate proportional to the rate to be measured, a condenser shunted across two electrodes of said device, means for charging the condenser comprising a source of current and a resistance and inductance of such magnitude relative to the capacity of the condenser that the charging circuit is a highly damped oscillating circuit, a second resistance connected in parallel circuit with the trigger tube device, at least one of said resistances being calibrated, and means for comparing the average voltage drop across a selected portion of the first-named resistance with the average voltage drop across a selected portion of the second resistance.

6. Electric flash producing apparatus for measuring impulse rates comprising, a gaseous conductor device having at least three electrodes of the type in which discharge between two main electrodes is initiated by varying the potential of the third electrode, means for varying the potential of the third electrode at a rate proportional to the rate to be measured, a condenser shunted across the main electrodes, means for charging the condenser comprising a source of current in series with a resistor, an inductance and an electric check valve, a second resistor connected in parallel circuit with the gaseous conductor device, at least one of said resistors being calibrated, and means for comparing the average voltage drop across a selected portion of the first-named resistor with the average voltage drop across a selected portion of the second resistor.

7. In flash producing apparatus, a gaseous conductor device having at least three electrodes of the type in which an electric discharge between two main electrodes may be initiated by changing the potential of the third electrode, a condenser shunted across the main electrodes, means for charging said condenser comprising a source of current and a conductor having resistance and inductance of such magnitude relative to the capacity of said condenser that the charging circuit is an oscillating circuit which is so highly damped that the maximum potential to which the condenser is charged is not more than 4% higher than the potential of the energy source, whereby the potential of the condenser at the time of discharge is maintained substantially uniform, and means for varying the potential of said third electrode to cause said condenser to discharge through said device.

8. Electric flash producing apparatus for measuring rates comprising a gaseous conductor device having at least three electrodes of a type in which discharge between two main electrodes is initiated by varying the potential of the third electrode, a condenser shunted across the main electrodes, means for periodically discharging the condenser through said device by impressing on said third electrode impulses which vary the potential of said third electrode at a rate proportional to the rate to be measured, and means for charging the condenser to a substantially constant potential, said means including an ammeter connected in series circuit with a source of potential for supplying an electric current to the condenser, said charging means being independent of the means for discharging the condenser.

9. Electric flash producing apparatus for determining impulse rates comprising a gaseous conductor device having at least three electrodes of a type in which discharge between two main electrodes is initiated by varying the potential of the third electrode, means for varying the potential of the third electrode at a rate proportional to the rate to be measured, means including a condenser and a resistance connected in series circuit with a source of potential for supplying electric current to the two main electrodes, a second resistance connected in parallel circuit with the gaseous conductor device, at least one of said resistances being calibrated, and means for comparing the average voltage drop across a selected portion of the first-named resistor with the average voltage drop across a selected portion of the second resistor.

10. In stroboscopic examination of a spark ignition engine, the improvement which comprises initiating in a flashing device light flashes of high intensity while supplying the energy for said flashes from a source independent of the engine ignition system, by impressing the ignition impulses of the engine on said flashing device.

11. In measuring the speed of a spark ignition engine, the improvement which comprises initiating in a generator of electrical pulses electrical pulses of controlled magnitude while supplying the energy for said pulses through a circuit which is independent of the ignition circuit, by impressing the ignition impulses of the engine on said pulse generator, and measuring the current flowing in said independent circuit.

12. In examining a spark ignition engine, the improvement which comprises initiating current flow through a trigger tube from a source of energy independent of the engine ignition system, by impressing the ignition impulses of the engine on said trigger tube.

13. Electric flash producing apparatus for measuring rates comprising a condenser, a trigger tube shunted across the condenser, means for discharging the condenser at selected intervals by impressing discharge initiating stimuli on said trigger tube at a rate proportional to the rate to be measured, means including an energy source adapted automatically to start recharging the condenser to a substantially constant potential as soon as the potential of the condenser drops below the potential of the energy source, said condenser charging means being independent of the means for discharging the condenser, and means responsive to the current which flows through the trigger tube for measuring the rate at which said discharge initiating stimuli are impressed.

14. Apparatus for use in examining an engine having a spark ignition system comprising a source of energy independent of the ignition system, a trigger tube, and means constructed and arranged for impressing the ignition impulses of the engine on said trigger tube to cause current to flow through said trigger tube from said source of energy.

15. Apparatus for determining the revolutions per minute of an engine having a spark ignition system comprising a source of energy independent of the ignition system and a trigger tube connected in an electrical circuit, means for impressing the ignition impulses of said engine on said trigger tube, and means for measuring the current flowing in said circuit.

16. Apparatus for use in examining an engine having a spark ignition system comprising a source of energy independent of the ignition system, a trigger tube, and means for impressing on said trigger tube the ignition impulses of the engine to cause a current to flow from said source through said trigger tube in pulses.

17. Apparatus for measuring the speed of a spark ignition engine comprising a generator of electrical pulses, a source of energy for the generator of electrical pulses independent of the ignition system, an ammeter, and means connected in the circuit with the ammeter for reducing the tendency of the ammeter needle to vibrate when measuring low engine speeds.

18. Apparatus for measuring the speed of a spark ignition engine comprising a source of energy independent of the ignition system of the engine, a generator of electrical pulses including a trigger tube, an ammeter, means connected in the circuit with the ammeter adapted to lessen the tendency of the ammeter needle to vibrate when measuring low engine speeds, and means for impressing on said trigger tube the ignition impulses of the engine to cause current from said independent source to flow through said trigger tube in pulses.

BENJAMIN MILLER.